United States Patent [19]

Wolff

[11] Patent Number: 4,667,979
[45] Date of Patent: May 26, 1987

[54] CUSHIONING MEMBER FOR THE INTERIOR OF AN AUTOMOTIVE VEHICLE

[75] Inventor: Martin Wolff, Hattingen, Fed. Rep. of Germany

[73] Assignee: Gebr. Happich GmbH, Fed. Rep. of Germany

[21] Appl. No.: 816,139

[22] Filed: Jan. 3, 1986

[30] Foreign Application Priority Data

Jan. 8, 1985 [DE] Fed. Rep. of Germany ....... 3500392

[51] Int. Cl.$^4$ ............................................. B60R 21/04
[52] U.S. Cl. ..................................... 280/752; 180/90; 296/70; 297/411
[58] Field of Search .................. 180/90; 280/751, 752; 297/411; 296/70

[56] References Cited

U.S. PATENT DOCUMENTS 2,560,009 7/1951 Straith ................................. 280/752
4,327,937 5/1982 Scholz et al. ....................... 280/752
4,427,215 1/1984 Weichenrieder et al. .......... 280/752

Primary Examiner—Richard A. Bertsch
Attorney, Agent, or Firm—Ostrolenk, Faber, Gerb & Soffen

[57] ABSTRACT

A cushioning member for the interior of a vehicle, such as an armrest, instrument panel or the like, comprising of an insert of relatively stable shape and a cushioning layer of foam plastic borne by it. An opening is accessible from the front of the cushioning member and extends approximately to the top resting surface thereof, the opening being adapted to receive an inserted functional part, for instance a loudspeaker. The opening is closed off by a masking member, the masking member being connected to the cushioning member in an arrangement for movement approximately perpendicular to the resting surface in response to a vertical deforming force on the resting surface.

12 Claims, 3 Drawing Figures

CUSHIONING MEMBER FOR THE INTERIOR OF AN AUTOMOTIVE VEHICLE

BACKGROUND OF THE INVENTION

1. Field of the Invention

The present invention relates to a cushioning member for the interior of an automotive vehicle, such as an armrest, an instrument panel or the like. It relates more particularly to a cushioning member comprising an insert of relatively stable shape and a cushioning layer of foam plastic supported by it, having an opening for receiving an inserted part such as a loudspeaker, which is accessible from the front and extends approximately up to a top resting surface of the cushioning member, and having a masking member which closes the opening.

2. Description of Related Art

In general, the space within vehicles is relatively limited, which frequently makes it necessary to provide cushioning members such as armrests, instrument panels, or the like with additional functional parts such as ash trays, air nozzles, loudspeakers or the like. Even if sufficient space is available for the accommodation of such functional parts, as is generally true in the case of instrument panels, then a problem may nevertheless develop if such functional parts must be placed in unfavorable positions in which they can impede the elastic deformability which is required in an instrument panel. In the case of an armrest, it is mandatory to provide a soft region for resting the arm, which, to allow for a vertical load to be placed on the armrest, requires a certain elastic deformability perpendicular to the upper resting surface. If such an additional rigid functional part is provided in an armrest, the result may be that the armrest no longer provides the required soft arm support.

SUMMARY OF THE INVENTION

Accordingly, an object of the present invention is to provide a cushioning member with an opening for a functional part in the cushioning member, and a masking member to close the opening, and adapt them to each other so as to coact to preserve the elastic deformability of the cushioning member, so that despite the presence of a relatively rigid additional functional part the cushioning member still satisfies general safety requirements.

In order to achieve this purpose, it is contemplated in accordance with an aspect of the invention that the masking member be supported on the cushioning member so as to be movable in a direction generally perpendicular to the resting surface.

By these means the result is obtained that the masking member conforms to the deformation caused by a vertical load; that is, it moves in the direction of a deforming force which acts perpendicular to the upper resting surface of the cushioning member.

According to a further aspect of the invention, the masking member may have on its rear portion (inside the cushioning member) at least one holding pin which extends parallel to the resting surface and is connected to the cushioning layer on the inside of the resting surface; as well as at least one guide pin which engages a groove inside the opening which extends perpendicular to the resting surface. Preferably two holding pins having the form of clips and two guide pins having the form of clips are provided, the latter having outwardly directed detent noses which face away from each other, for engaging grooves formed in the side walls of the opening in the cushioning member. By these means it is ensured that the masking member moves vertically downward in the direction of a deforming force and vertically upward in the direction of a restoring force caused by the elastic deformation of the cushioning body. Thus, as a result of the connecting members described, a functionally reliable engagement is provided between the cushioning member and the masking member, having both simplicity in fitting and adaptation to one another of the parts to be joined, as well as compensation for possible variations in tolerance.

In accordance with another advantageous aspect of the invention, the masking member has an upper angle arm which engages a trough-shaped depression in the upper resting surface, and the upper side of which terminates flush with the upper resting surface. Between the angle arm and the holding pin or pins is formed an insertion channel to receive an upper portion of the wall of the cushioning member between the opening and the trough-shaped depression. Thus the wall region is clamped in the insertion channel. In order to further increase the assurance against pulling out, this upper wall region is preferably provided on its side in the opening with a groove for engaging detent projections formed on the holding pins.

Another advantageous aspect of the invention consists in that the masking member has a lower angle arm which is countersunk into and follows the contour of the cushioning member, the lower angle arm terminating at the mounting surface along which the cushioning member lies against a fastening wall. An upwardly directed hook-shaped extension, which engages a recess in the cushioning member, and the outside of which terminates approximately flush with the mounting surface of the cushioning member, is preferably provided in the free rear end region of the lower angle arm.

The particular advantages of the invention are seen to include the fact that the comparatively rigid masking member can move vertically with respect to the cushioning member in response to a vertical force thereon, thereby maintaining the soft support provided by the resting region despite the presence in the cushioning member of a functional part, and furthermore the fact that a reliably firm connection is obtained between the parts which connection can still, in case of need, be opened by disengaging the clips with the aid of a tool.

BRIEF DESCRIPTION OF THE DRAWINGS

Other objects, features and advantages of the invention will be appreciated from the following detailed description of a preferred embodiment thereof, with reference to the drawings, in which.

DETAILED DESCRIPTION OF A PREFERRED EMBODIMENT

Figure 1:
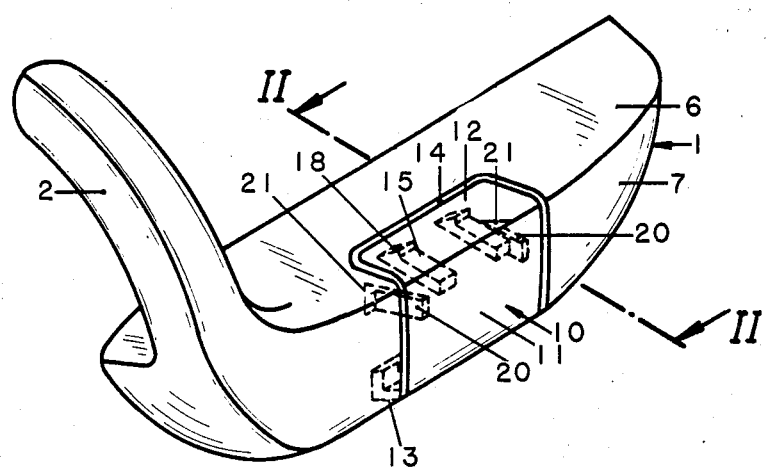
FIG. 1 shows a cushioning member according to an embodiment of the invention, having the form of an armrest with a handle.

Referring to FIG. 1, there is seen a cushioning member having the form of an armrest 1 with an integrated handle 2. The cushioning member has a body portion which includes an insert 3 and a cushioning layer 4 of foam plastic substantially covering the insert 3. On the outside, the cushioning layer 4 is covered by a plastic skin 5.

The armrest 1 has a resting surface 6, a front wall surface 7 and a mounting surface 8. In the central region of the armrest there is provided an opening 9 which is accessible from the front wall surface 7 and serves to receive an insertion part, for instance a loudspeaker (not shown). This opening 9, which extends upward and across part of the resting surface 6, is closed by a masking member 10 arranged in front of it. The masking member 10 includes a web 11, adjoining the top end of which there is a first integral angle arm 12, and at the bottom end a second integral angle arm 13. Thus the masking member 10 has an approximately U-shaped cross section. The angle arm 12 engages a trough-like depression 14 provided in the region of the resting surface 6 in such a manner that its lower part rests on the bottom of the depression 14 and its upper part is approximately flush with the resting surface 6.

On the rear of the masking member 10 are provided two holding pins 15 which are spaced apart from each other and are directed approximately parallel to the angle arm 12. The holding pins 15 and angle arm 12 together form an insertion channel 16 to receive the wall region 17, which is the upper portion of the cushioning member between the opening 9 and the trough-shaped depression 14. On the free ends of the holding pins 15 are detent noses 18 for clipping into a groove 19 or the like formed in the bottom of the wall region 17.

Figure 2:
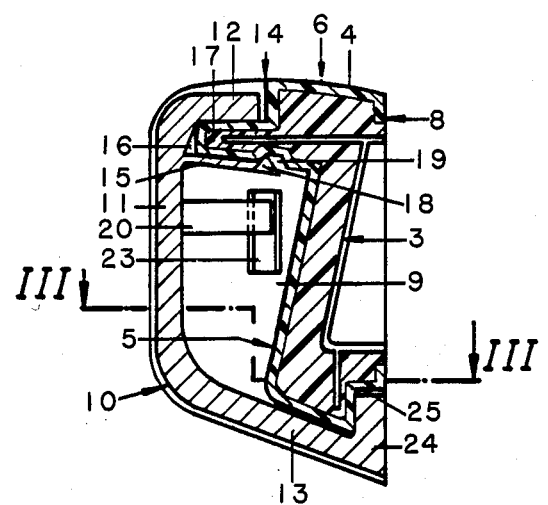
FIG. 2 is a cross-section taken along the line II—II of FIG. 1.

Also on the rear of the masking member 10 are two guide pins 20, each having the form of a clip or the like, which by outwardly directed detent noses 21 which face away from each other (see FIG. 1), engage into grooves 23 formed in the side walls 22 of the opening 9 (see FIG. 2).

On the free end of the lower angle arm 13 there is arranged an upward-directed hook-shaped extension 24, the outside of which terminates approximately flush with the mounting surface 8, or may be set back slightly inward toward the front of the masking member and away from the surface 8. The hook-shaped extension 24 engages a recess 25 in the lower rear of the armrest 1.

The masking member 10 preferably comprises relatively rigid material which, however, has flexural elastic properties and is preferably formed by plastic injection molding.

Figure 3:
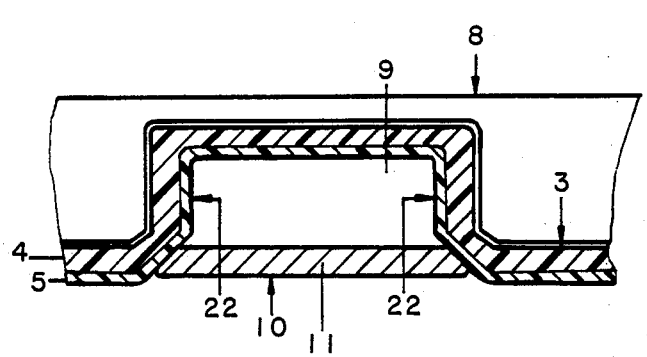
FIG. 3 is a cross-section taken along the line III—III of FIG. 2.

In mounting the masking member 10, the hookshaped extension 24 is first of all placed into the recess 25, whereupon the masking member 10 is swung into its final position, as shown in FIGS. 1 to 3, the holding pins 15 and guide pins 20 engaging the armrest as follows: The holding pins 15 clamp the resting region (angle arm 12) of the masking member 10 to the armrest and the wall region 17, and thus establish a well-defined vertical position for the masking member 10 with respect to the cushioning member. The detent noses 21 of the lateral guide pins 20 lie in the downwardly extending grooves 23 and produce a well-defined lateral positioning of the masking member 10 with respect to the cushioning member. The hooking portion (extension 24) of the masking member 10, as well as the clipping portions of the holding pins 15 and guide pins 20, are so configured and dimensioned that the right and left sides of the masking member 10 always rest on the cushioning layer 4, 5 so as to compensate for tolerances (FIG. 3).

If a deformation force is now applied perpendicularly to the resting surface 6, the armrest deforms elastically in this region. The masking member 10 is thereby pushed downward, including possibly in parts of the cushioning layer which have not been so deformed, whereby a restoring force caused by the elastic deformation is brought about in those regions of the cushioning layer which are clamped between the upper clip portions (holding pins 15) and the resting region of the masking member 10. The vertical displacement of the masking member 10 is made possible by the downwardly extending lateral detent grooves 23 and by the configuration of the hook-shaped extension 24 and recess 25, none of which provides any stop for the masking member in the downward direction.

Although an illustrative embodiment of the invention has been disclosed herein, it is to be understood that the invention is not limited to such embodiment. Rather, modifications and variations thereof may occur to those skilled in the art within the scope of the invention, which is defined by the claims.

What is claimed is:

1. A cushioning member for the interior of an automotive vehicle, comprising:
    (a) a body member including a relatively rigid insert portion which is substantially covered by a resilient cushioning layer, said body member having
        (1) a resting surface for resiliently resisting external forces caused by objects or the like placed thereon,
        (2) a rear mounting surface for attachment to a mounting wall or the like of the vehicle, and
        (3) a front surface on the side of the body portion away from the mounting wall;
    (b) said body member further defining a front opening for access into the body member from the front surface thereof, said front opening extending to substantially adjacent the resting surface; and
    (c) a relatively rigid masking member which is configured and dimensioned to close said opening, said masking member being mounted in said body member so as to be slidable in said body member and away from said resting surface in response to such external forces, so as to maintain the resilience of said resting surface with respect to such forces.

2. A cushioning member according to claim 1, wherein:
    the resting surface is in an upper portion of the body member for resiliently resisting external vertical forces; and
    the masking member is vertically slidable in said body member in response to such external vertical forces.

3. A cushioning member according to claim 2, wherein the masking member is provided on its rear side with at least one holding pin which extends parallel to the resting surface for engaging the inside of the body member adjacent the resting surface, and with at least one guide pin which vertically slidably engages a groove formed in the body member which extends generally perpendicular to the resting surface.

4. A cushioning member according to claim 3, wherein the masking member is provided on its rear side with two clip-like holding pins and two clip-like guide pins, the latter having outwardly directed detent noses which face away from each other and vertically slidably engage respective grooves formed in the body member adjacent the opening which extend generally perpendicular to the resting surface.

5. A cushioning member according to claim 3, wherein the masking member has an upper angle arm, an inner side of which engages a trough-shaped depression formed in the resting surface, and the outer side of which terminates substantially flush with the resting surface.

6. A cushioning member according to claim 5, wherein the upper angle arm and the holding pin define an insertion channel therebetween to receive an inserted portion of the body member between the opening and the trough-shaped depression.

7. A cushioning member according to claim 6, wherein said inserted portion of the body member is provided on its lower side with a groove for engaging detent noses formed on the holding pin.

8. A cushioning member according to claim 2, wherein the masking member has a lower angle arm which is countersunk into the lower contour of the cushioning member and terminates adjacent the mounting surface by which the cushioning member is attached to the vehicle.

9. A cushioning member according to claim 8, wherein the lower angle arm has a free end region having an upwardly directed hook-shaped extension adjacent said mounting surface which engages a downward recess formed in the cushioning member, the outer side of the extension terminating approximately flush with the mounting surface of the cushioning member.

10. A cushioning member according to claim 1, wherein, after cessation of such external forces, the masking member is slidable back to its original position substantially adjacent to said resting surface in response to elastic restoring forces exerted by said body member.

11. A cushioning member for the interior of an auotmotive vehicle, comprising:
    (a) a body member which is substantially covered by a resilient cushioning layer, said body member having a plurality of surfaces including
        (1) a resting surface for resiliently resisting external forces caused by objects or the like placed thereon, and
        (2) a mounting surface for attachment to a mounting wall or the like of the vehicle; and
    (b) said body member further defining an opening for access into the body member from at least one of the surfaces thereof, said opening being defined substantially adjacent at least part of the resting surface; and
    (c) a relatively rigid masking member which is configured to close said opening, said masking member being mounted in said body member so as to be slidable in said body member and away from said resting surface in response to such external forces, so as to maintain the resilience of said resting surface with respect to such forces.

12. A cushioning member according to claim 11, wherein, after cessation of such external forces, the masking member is slidable back to its original position substantially adjacent to said resting surface in response to elastic restoring forces exerted by said body member.

* * * * *